(12) United States Patent
Aguilar Ruelas et al.

(10) Patent No.: US 11,084,550 B2
(45) Date of Patent: Aug. 10, 2021

(54) CONVERTIBLE SCOOTER

(71) Applicant: Ford Global Technologies, LLC, Dearborn, MI (US)

(72) Inventors: Eduardo Arturo Aguilar Ruelas, Mexico City (MX); Hector Alberto Mendoza Saldivar, Cuautitlan Izcalli (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 299 days.

(21) Appl. No.: 16/324,976

(22) PCT Filed: Aug. 15, 2016

(86) PCT No.: PCT/US2016/046979
§ 371 (c)(1),
(2) Date: Feb. 12, 2019

(87) PCT Pub. No.: WO2018/034640
PCT Pub. Date: Feb. 22, 2018

(65) Prior Publication Data
US 2019/0176923 A1 Jun. 13, 2019

(51) Int. Cl.
*B60K 1/00* (2006.01)
*B62K 15/00* (2006.01)
(Continued)

(52) U.S. Cl.
CPC .............. *B62K 15/00* (2013.01); *B62K 3/002* (2013.01); *B62K 5/01* (2013.01); *B62K 5/06* (2013.01);
(Continued)

(58) Field of Classification Search
CPC .................. B62K 15/00; B62K 15/006; B62K 2015/001; B62K 2015/003;
(Continued)

(56) References Cited

U.S. PATENT DOCUMENTS 4,540,192 A * 9/1985 Shelton .................. B62K 3/002
280/220
4,824,130 A 4/1989 Chiu
(Continued)

FOREIGN PATENT DOCUMENTS

CN 2936897 Y 8/2007
CN 102632952 A 8/2012
(Continued)

OTHER PUBLICATIONS

Gatto, "Geely McCar: Electric vehicle and scooter in one", Apr. 21, 2011, http://phys.org/news/2011-04-geely-mccar-electric-vehicle-scooter.html.
(Continued)

*Primary Examiner* — James M Dolak
(74) *Attorney, Agent, or Firm* — Brandon Hicks; Bejin Bieneman PLC

(57) ABSTRACT

A scooter includes a scooter body with substantially triangular front and rear body portions. The substantially triangular front body portion has a front side and a first connecting side. The front side and the first connecting side of the front body portion form a first acute angle. The substantially triangular rear body portion has a rear side and a second connecting side. The rear side and the second connecting side of the rear body portion form a second acute angle. The first and the second connecting sides are connected so as to linearly slide with respect to one another such that when the scooter body is in an extended state the front side is in a greater distance from the rear side than a distance when the scooter body is in a compact state.

17 Claims, 9 Drawing Sheets

(51) Int. Cl.
*B62M 11/02* (2006.01)
*B62K 3/00* (2006.01)
*B62K 13/04* (2006.01)
*B62K 5/06* (2006.01)
*B62M 9/02* (2006.01)
*B62K 13/06* (2006.01)
*B62M 6/60* (2010.01)
*B62K 5/01* (2013.01)
*B62K 5/08* (2006.01)
*B62M 6/45* (2010.01)
*B62M 6/70* (2010.01)
*B62M 9/00* (2006.01)
*B62K 5/027* (2013.01)

(52) U.S. Cl.
CPC ........... *B62K 5/08* (2013.01); *B62K 13/04* (2013.01); *B62K 13/06* (2013.01); *B62M 6/45* (2013.01); *B62M 6/60* (2013.01); *B62M 6/70* (2013.01); *B62M 9/00* (2013.01); *B62M 9/02* (2013.01); *B62M 11/02* (2013.01); *B62K 5/027* (2013.01); *B62K 2015/001* (2013.01); *B62K 2202/00* (2013.01); *B62K 2204/00* (2013.01)

(58) Field of Classification Search
CPC .. B62K 2015/005; B62K 13/04; B62K 13/06; B62K 13/08; B62K 13/00; B62K 3/00; B62K 3/02; B62K 3/002; B62K 5/00; B62K 5/02; B62K 5/027; B62K 5/025; B62K 5/08; B62K 5/01; B62K 5/06; B62K 2202/00; B62K 2204/00; B62M 9/00; B62M 9/02; B62M 11/00; B62M 11/02; B62M 6/60; B62M 6/45; B62M 6/70; B62M 6/00; B62M 6/40
See application file for complete search history.

(56) References Cited

U.S. PATENT DOCUMENTS

| | | | | |
|---|---|---|---|---|
| 5,097,922 A | | 3/1992 | Stagi | |
| 5,312,126 A | * | 5/1994 | Shortt | B62K 5/00 280/287 |
| 5,669,497 A | | 9/1997 | Evans et al. | |
| 5,927,733 A | * | 7/1999 | Banda | B62K 21/18 280/87.041 |
| 6,270,103 B1 | * | 8/2001 | Grimm | B62K 21/00 280/270 |
| 6,378,642 B1 | * | 4/2002 | Sutton | B62D 61/08 180/208 |
| 6,485,039 B1 | * | 11/2002 | Ming-Fu | B62K 3/002 280/282 |
| 6,851,498 B1 | | 2/2005 | Sauve | |
| 8,056,915 B2 | * | 11/2011 | Pang | B62K 3/002 280/221 |
| 8,627,910 B1 | * | 1/2014 | Carque | B62K 15/00 180/65.1 |
| 9,174,692 B2 | * | 11/2015 | Treadway | B62K 15/008 |
| 9,272,739 B2 | * | 3/2016 | Zaid | B62K 15/008 |
| 9,381,973 B2 | * | 7/2016 | Williams | B62M 6/90 |
| 9,440,698 B2 | * | 9/2016 | Dadoosh | B62J 25/00 |
| 9,469,364 B2 | * | 10/2016 | Banasky | B62K 15/006 |
| 9,815,520 B2 | * | 11/2017 | Figueroa | B62K 13/06 |
| 9,878,758 B2 | * | 1/2018 | Lee | B62K 23/02 |
| 10,919,594 B2 | * | 2/2021 | Thompson | B62M 6/40 |
| 2004/0195794 A1 | | 10/2004 | Fan | |
| 2005/0263979 A1 | | 12/2005 | Sinclair et al. | |
| 2006/0220334 A1 | | 10/2006 | Liao | |
| 2014/0090910 A1 | | 4/2014 | Treadway et al. | |
| 2015/0035250 A1 | | 2/2015 | Jayasuriya et al. | |
| 2015/0375820 A1 | | 12/2015 | Banasky et al. | |

FOREIGN PATENT DOCUMENTS

| | | |
|---|---|---|
| CN | 105253231 A | 1/2016 |
| DE | 10218932 C1 | 11/2003 |
| DE | 102010027997 A1 | 3/2011 |
| EP | 2481655 A2 | 8/2012 |

OTHER PUBLICATIONS

International Search Report and Written Opinion dated Aug. 15, 2016; Appl. No. PCT/US2016/046979.

China Notification of First Office Action dated Apr. 29, 2020 re Appl. No. 2016800884692 (English Translation).

* cited by examiner

CONVERTIBLE SCOOTER

BACKGROUND

With growing populations and a shift toward more urbanization, urban population densities are increasing. Users increasingly ride public transportation systems and walk from public transport stations to final destinations. Moreover, many suburban residents now park their cars in parking structures in city centers and walk to their final destination to avoid traffic congestion of city centers. An improved transportation device could support those trends.

DETAILED DESCRIPTION

Introduction

Figure 1:
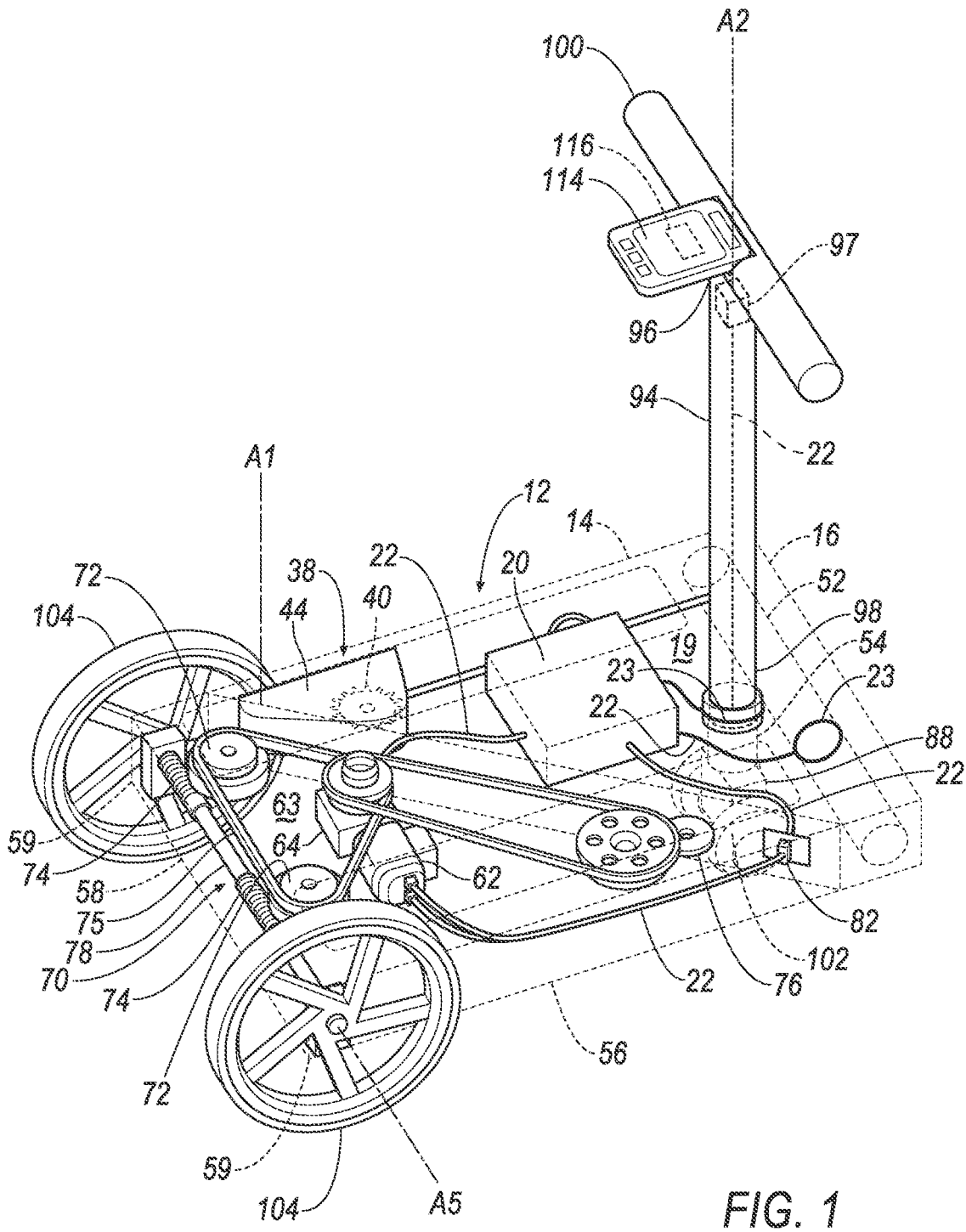
FIG. 1 is a perspective view of an example scooter in a "standing" mode.

With reference to the Figures, wherein like numerals indicate like parts throughout the several views, an example scooter 10 includes a scooter body 12 with substantially triangular front and rear body portions 14, 56. The substantially triangular front body portion 14 has a front side 16 and a first connecting side 18. The front side 16 and the first connecting side 18 of the front body portion 14 form a first acute angle 17. The substantially triangular rear body portion 56 has a rear side 58 and a second connecting side 60. The rear side 58 and the second connecting side 60 of the rear body portion 56 form a second acute angle 57. The first and the second connecting sides 18, 60 are connected so as to linearly slide with respect to one another such that when the scooter body 12 is in an extended state the front side 16 is in a greater distance D1 from the rear side 58 than a distance D2 when the scooter body 12 is in a compact state.

The scooter 10 will typically be used on a ground surface, e.g., a road, sidewalk, walkway, parking lot, etc. The scooter 10 may be operated in a standing mode, e.g., a user can stand on the scooter body 12. When the scooter 10 is operated in the standing mode, the scooter body 12 is in the compact state, e.g., by sliding the first and the second connecting sides toward one another. The scooter body 12 may be operated in a bike mode while the scooter body 12 is in the extended state, e.g., by sliding the first and the second connecting sides away from one another. Thus, a user may operate the scooter 10 in the standing mode or the bike mode. Additionally, the scooter 10 can be stored in a vehicle trunk 118 when the scooter body 12 is in the compact state.

System Elements

Figure 2:
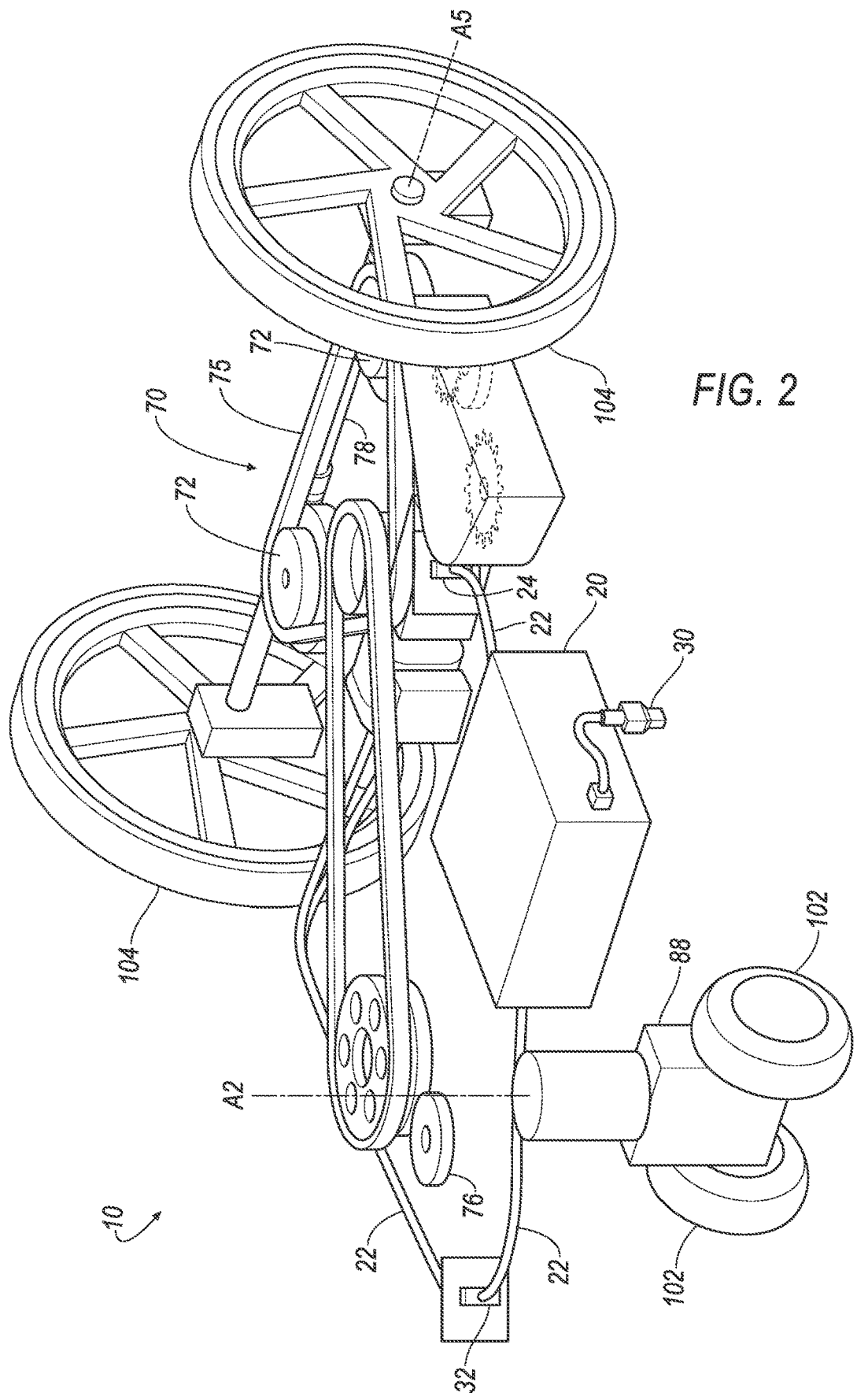
FIG. 2 is a detailed perspective view of certain internal elements of the scooter of FIG. 1 without covers.
Figure 3:
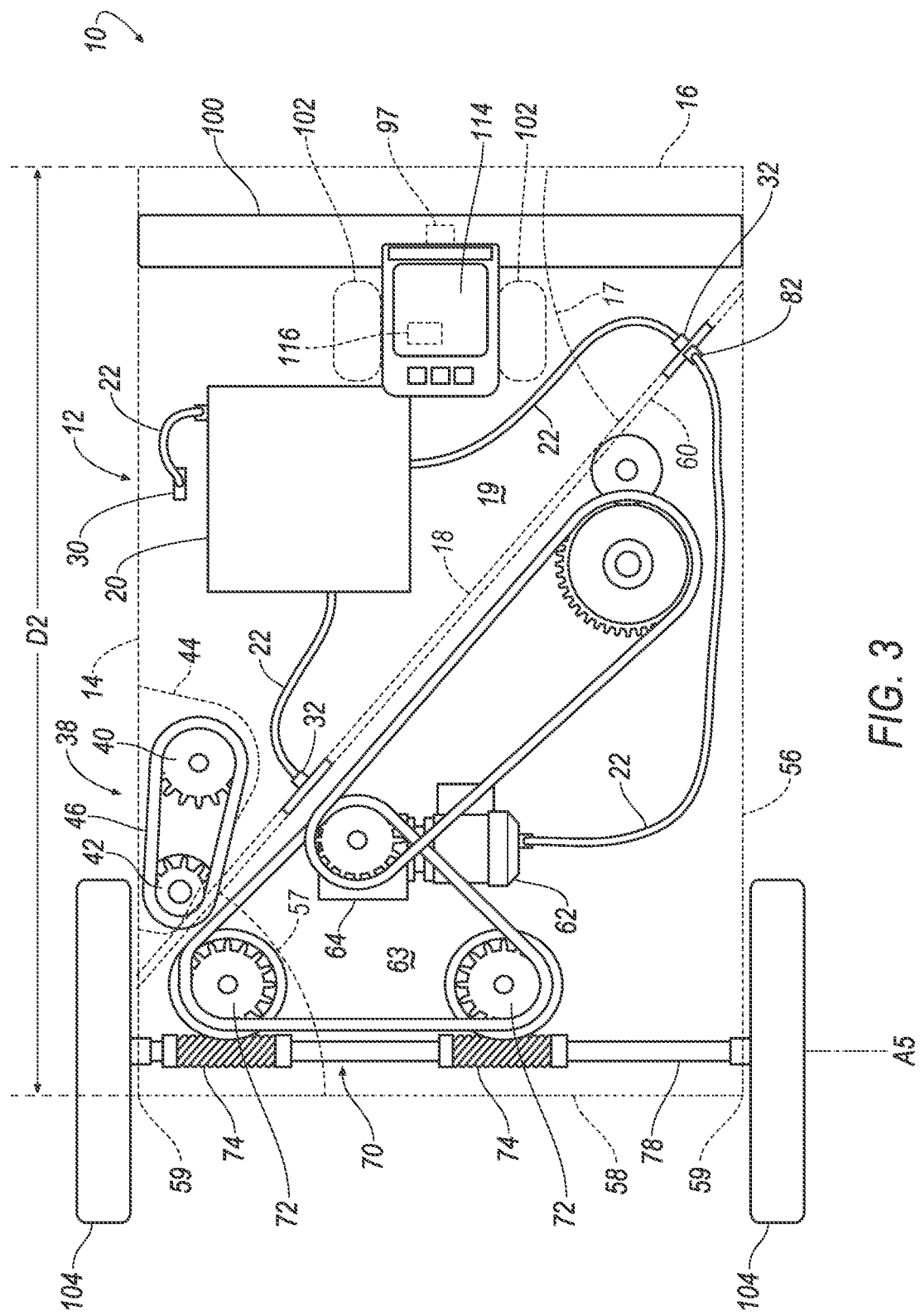
FIG. 3 is a top view of the scooter of FIG. 1.

FIGS. 1-3 illustrate an example scooter 10 operated in the standing mode while the front body portion 14 and the rear body portion 56 of scooter body 12 are mechanically engaged with one another as explained further below. Surfaces 19, 63 of the body portions 14, 56 together form a riding surface on which a user may stand while the scooter 10 is in the standing mode. The scooter 10 includes one or more front wheels 102 rotatably mounted to the front body portion 14, e.g., a bottom surface opposite the top surface 19, and multiple rear wheels 104 rotatably mounted to the rear body portion 56, e.g., at first and second ends 59 of the rear body portion 56. In order to reduce a risk of the user's foot slipping off the surfaces 19, 63, the surfaces 19, 63 may include grooves, a rough surface, and or other materials or structures to increase friction between the surfaces 19, 63 and a footwear of the user.

With continued reference to FIGS. 1-3, the front body portion 14 is a substantially triangular shaped body part made of beams, plates, etc. connected to one another by, e.g., welding. The front body portion 14 may be formed of metal, hard plastic, or any other suitable material.

The scooter 10 can include a steering column 94 having an upper end 96 and a lower end 98. The steering column 94 is pivotably mounted to the front body portion 14, e.g., at the lower end 98. Handlebars 100 can be mounted to the steering column 94, e.g., at the upper end 96. The user may hold the handlebars 100 and steer the scooter 10 by pivoting the steering column 94 about an axis A2 transverse to the surface 19 of the front body portion 14. The steering column 94 can be pivotably mounted to a first steering column holder 54 that is a bore extending at least partially through the front body portion 14 transverse to the first body portion 14 surface 19. The first steering column holder 54 may be cylindrical and may include sleeves, bearings, etc. allowing the steering column 94 to pivot relative to the front body portion 14.

The scooter 10 may include a wheel holder assembly 88 coupling the lower end 98 of the steering column 94 to the front wheels 102, when the scooter 10 is operated in the standing mode. By pivoting the steering column 94, the front wheels 102 may swivel about the axis A2.

The scooter 10 may include a crank assembly 38 which may be in a retracted state when the scooter body 12 is in the compact state, e.g., the scooter 10 is operated in the standing mode. The crank assembly 38 may include a crank assembly frame 44, a crank gear 40 and a cross engaging gear 42. The crank gear 40 and the cross engaging gear 42 are rotatably mounted to the crank assembly frame 44 and driveably coupled to one another, e.g., with a crank chain 46. The crank assembly 38 may be retractable, e.g., pivoting about an axis A1 transverse to the front body portion 14 surface 19.

In the standing mode, the crank assembly 38 may be in a retracted state, i.e., the crank gear 40 may be retracted within the front body portion 14. Additionally, the cross engaging gear 42 may be disengaged from a rear cross engaging gear 76 of the rear body portion 56 when the crank assembly 38 is in the retracted state. As discussed below in further detail, the crank assembly 38 may be in an unretracted state, e.g., when the scooter 10 is operated in the bike mode (see FIGS. 4 and 5).

The crank assembly frame 44 includes beams, sheets, etc., mechanically connected to one another, e.g., welded. The crank assembly frame 44 rotationally holds the crank gear 40 and the cross engaging gear 42. The frame 44 can be formed of a suitable rigid material, e.g., metal, hard plastic, etc.

The rear body portion 56 may be a substantially triangular shaped body part made of beams, plates, etc. connected to one another by, e.g., welding. The rear body portion 56 has the rear side 58 and the second connecting side 60. The rear body portion 56 may be formed of metal, hard plastic, or any other suitable material. The rear side 58 and the second connecting side 60 form a second acute angle 57, i.e., an angle less than 90 degrees.

Figure 4:
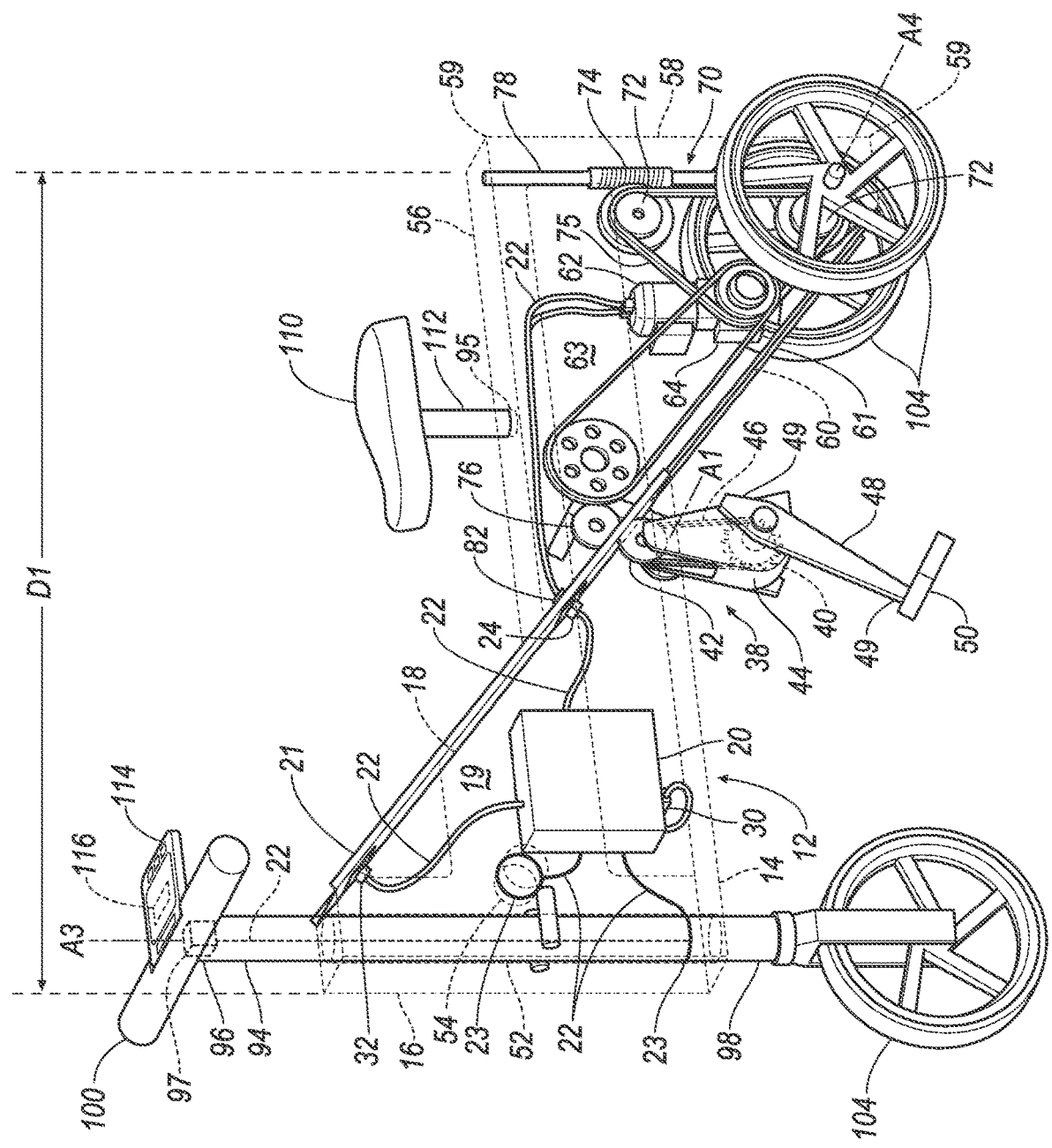
FIG. 4 is a perspective view of the scooter of FIG. 1, in a "bike" mode.

The first and second connecting side 18, 60 are slideably engaged (see FIG. 4). The connecting sides 18 and 60 may include a linear slide mechanism including two longitudinally engaged elongated slides 21, 61 (shown in FIG. 4 but omitted from other figures for ease of illustration of other features), a first elongated slide 21 mounted to the front body portion 14 and second elongated slide mounted 61 to the rear body portion 56. The elongated slides 21, 61 are slideably engaged with one another. In order to releaseably lock the scooter body 12 in the extended state or the compact state, the elongated slides 21, 61 may have a stop, a locking knob or any other suitable mechanism to releaseably lock the elongated slides 21, 61 with respect to one another. Alternatively, any other suitable mechanism allowing the sides 18 and 60 slide along the connecting sides 18 and 60 can be mounted to the connecting sides 18, 60.

In order to transfer a mechanical torque, e.g., produced by an electric motor 62 or the pedals 50, to the wheels 104, the scooter 10 may include a gearbox 64 and a transmission 70.

The gearbox 64 may regulate a torque transfer to the transmission 70, e.g., a speed may be reduced by the gearbox 64 while the torque is increased respectively. The gearbox 64 has an input shaft driveably coupled to the electric motor 62, and an output shaft driveably coupled to the wheels 102, 104. In the standing mode, the worm shaft 78 may be coupled to the rear wheels 104. In the bike mode the worm gears 72 may be directly coupled to the rear wheels 104 (see FIGS. 4 and 5).

The transmission 70, e.g., a worm drive, transfers the torque to the rear wheels 104. The transmission 70 may include a worm 74 meshed with worm gears 72. The worm gears 72 are driveably coupled, e.g., via a transmission chain 75, to the gearbox 64 output shaft. Alternatively, a different transmission may couple the gearbox 64 output shaft to the wheels 102, 104.

The worm gears 72 are gears meshed with the worms 74 mounted on an outer circumference of a worm shaft 78. The worm shaft 78 may be a rod, e.g., formed of steel. Worm shaft 78 ends 79 can be driveably coupled to the wheels 104, in the standing mode, i.e., the rear wheels 104 rotate about an axis A5 substantially parallel to the surfaces 19, 63. The transmission chain 75 can couple the worm drive 70 to the gearbox 64 output shaft. The chain 75 may be a metal chain, a belt, etc.

The rear cross engaging gear 76 may be a gear rotatably mounted to the rear body portion 56. When the scooter 10 is operated in the standing mode, the rear cross engaging gear 76 and the front body portion 14 crank assembly 38 cross engaging gear 42 are not engaged.

Figure 5:
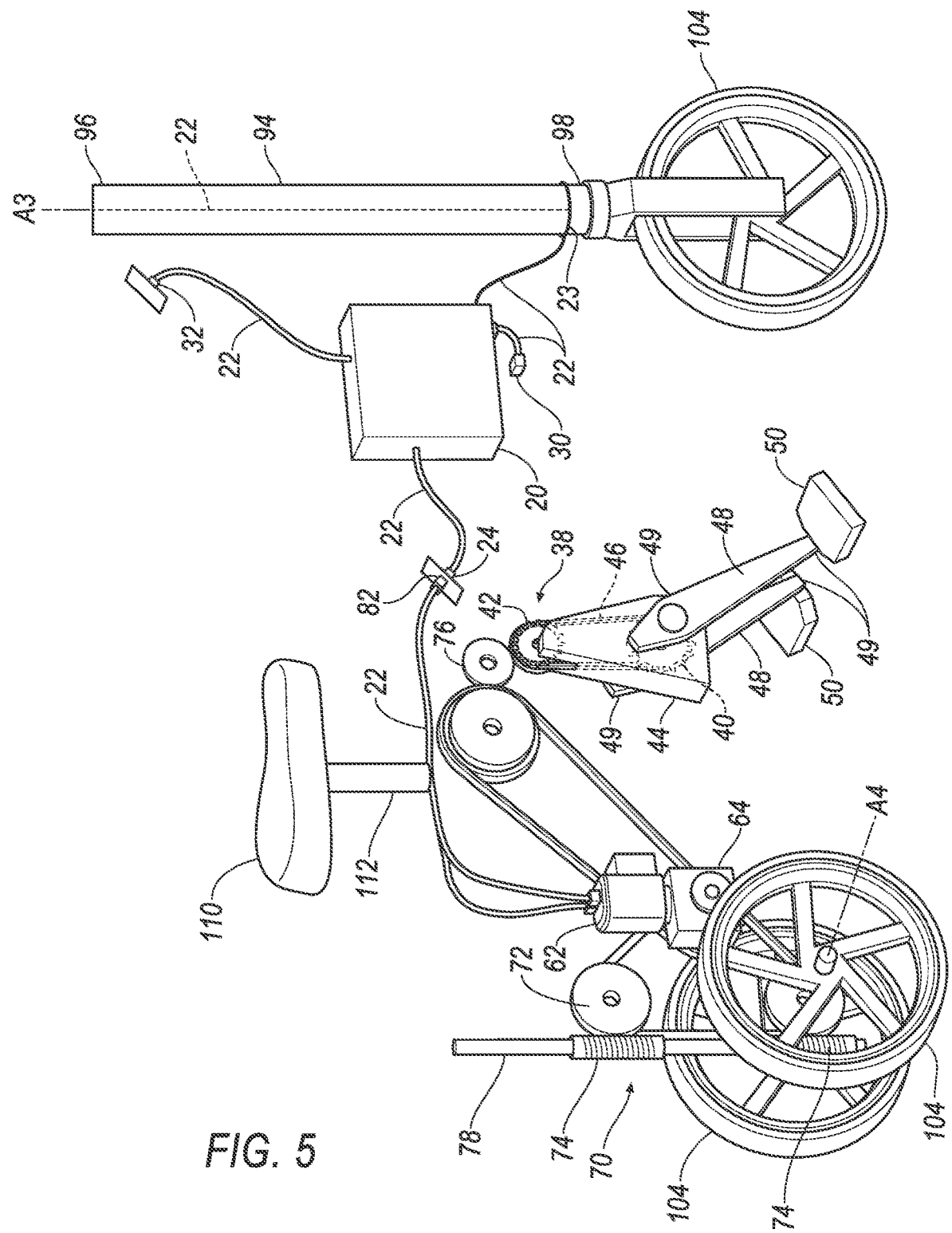
FIG. 5 is a detailed perspective view of the scooter of FIG. 1 in the "Bike" mode.

As shown in FIGS. 4 and 5 Figure, the scooter 10 may be operated in bike mode wherein the user can sit on a seat 110 supported by a seat post 112. The seat post 112 typically is releaseably mounted to the rear body portion 56, e.g., the rear body further includes a seat post holder 95 substantially parallel to the front and the rear sides 16, and a seat post 112 is releaseably mountable to the seat post holder 95. The scooter body 12 is in the extended state when the scooter 10 is operated in the bike mode.

The front body portion 14 includes a second steering column holder 52 transverse to the first steering column holder 54 for mounting the steering column 94 to the scooter 10 when it is operated in the bike mode. The second steering column holder 52 may include a bore extending at least partially through the front body portion 14 parallel to the first body portion 14 surface 19. The holder 52 may be cylindrical and may include sleeves, bearings, etc., allowing the steering column 94 to pivot relative to the front body portion 14 about an axis A3.

In the bike mode, a front bike wheel 104, which may be of similar size as the rear wheels 104, can be releaseably and rotatably mounted to the steering column 94 lower end 98, e.g., via bearings, etc. The rear wheels 104 can be releaseably mounted to one of the transmission 70 worm gears 72, e.g., via a shaft. Alternatively, the torque can be transferred to the rear wheels 104 while mounted to another gear or shaft mechanically engaged with the transmission 70. The rear wheels 104 may rotate about an axis A4 transverse to the rear body portion 56 surface 63. In the bike mode, the surfaces 19, 63 may be referred to as side surfaces 19, 63, because, in the bike mode, the surfaces 19, 63 can be transverse to the ground surface.

With continued reference to FIGS. 4 and 5, the scooter 10 may include two pedals 50 and two crank arms 48. Each crank arm has two ends 49. Each pedal 50 is releaseably mounted to a first end 49 of one of the crank arms 48. A second end of each crank arm 48 is releaseably mounted to the crank gear 40. For example, when the scooter 10 is operated in the bike mode and the crank assembly 38 is in the unretracted state, the pedals 50 and the crank arms 48 may be mounted to the crank assembly 38. Therefore, the crank arms 48 transfer a torque applied by the user to the crank assembly 38 crank gear 40. Then, the torque is transferred to the transmission 70 and, thus the rear wheels 104, via the crank gear 40 through, e.g., the crank chain 46 and the cross engaging gear 42. That is, the crank assembly 38 can be driveably engageable with the rear wheels 104. When the scooter 10 is operated in the standing mode, the crank assembly 38 may be in the retracted state (see FIG. 3).

The cross engaging gear 42 is a gear supported by the crank assembly frame 44 and driveably coupled to the crank gear 40. In the bike mode, the cross engaging gear 42 can be mechanically engaged with a rear cross engaging gear 76 of the rear body portion 56 to transfer the torque applied by the user via further mechanical components, discussed below in further detail, to the rear wheels 104. In the standing mode, the crank assembly 38 may be in the retracted state and the cross engaging gear 42 may be disengaged from the rear cross engaging gear 76, e.g., when the scooter 10 is operated in the standing mode (See FIG. 3).

Figure 6:
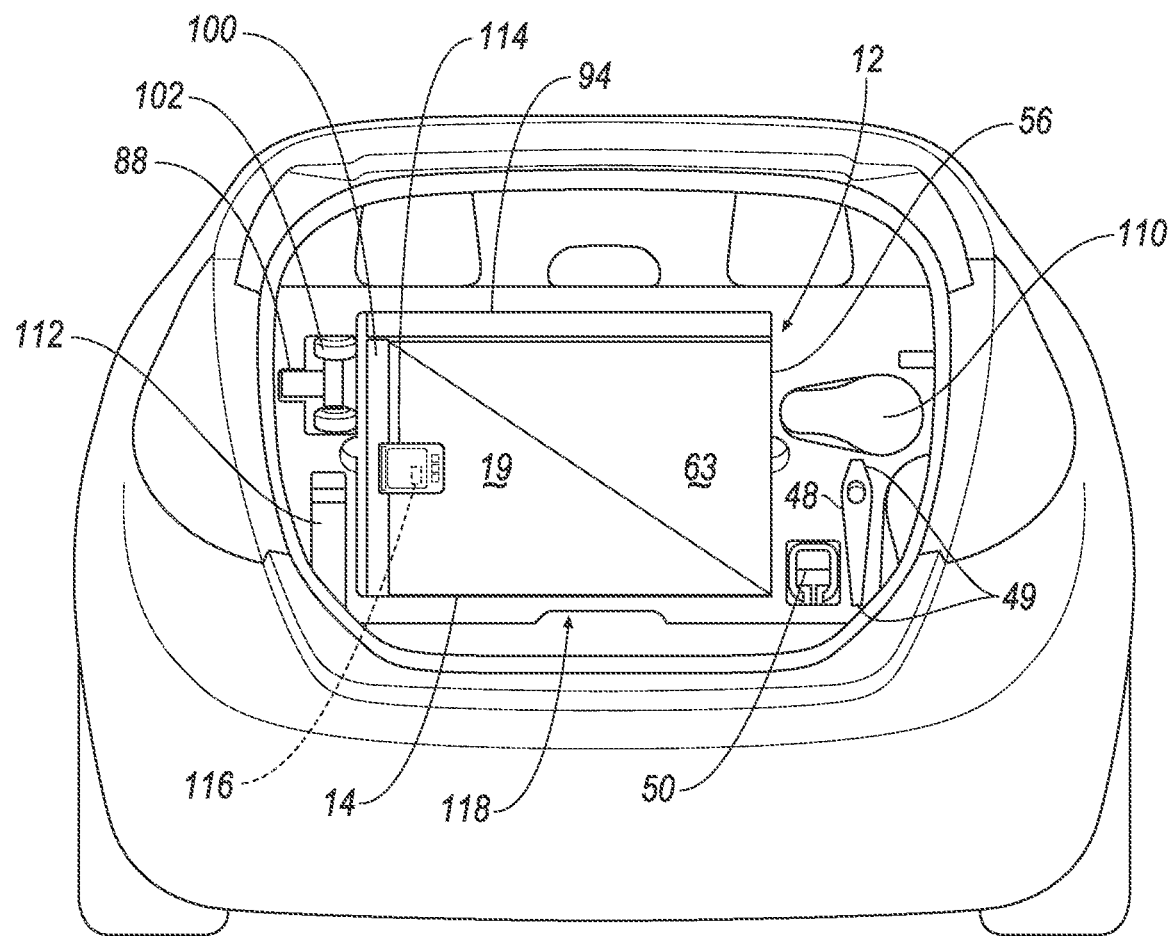
FIG. 6 is a perspective view of the scooter of FIG. 1 stored in a vehicle trunk.

As shown in FIG. 6, some or all scooter 10 parts may be storable in a vehicle trunk 118. To save storage space, the scooter 10 body 12 may be placed in the compact state and stored separately from releaseably mounted components of the scooter 10 such as the pedals 50. For example, the pedals 50, the crank arms 48, the seat post 112, the seat 110, the wheel holder assembly 88, the front wheels 102, and the steering column 94, may unmounted from the scooter 10 body and may be stored in associated places in the vehicle trunk 118, e.g., on a back of rear vehicle seats.

Figure 7:
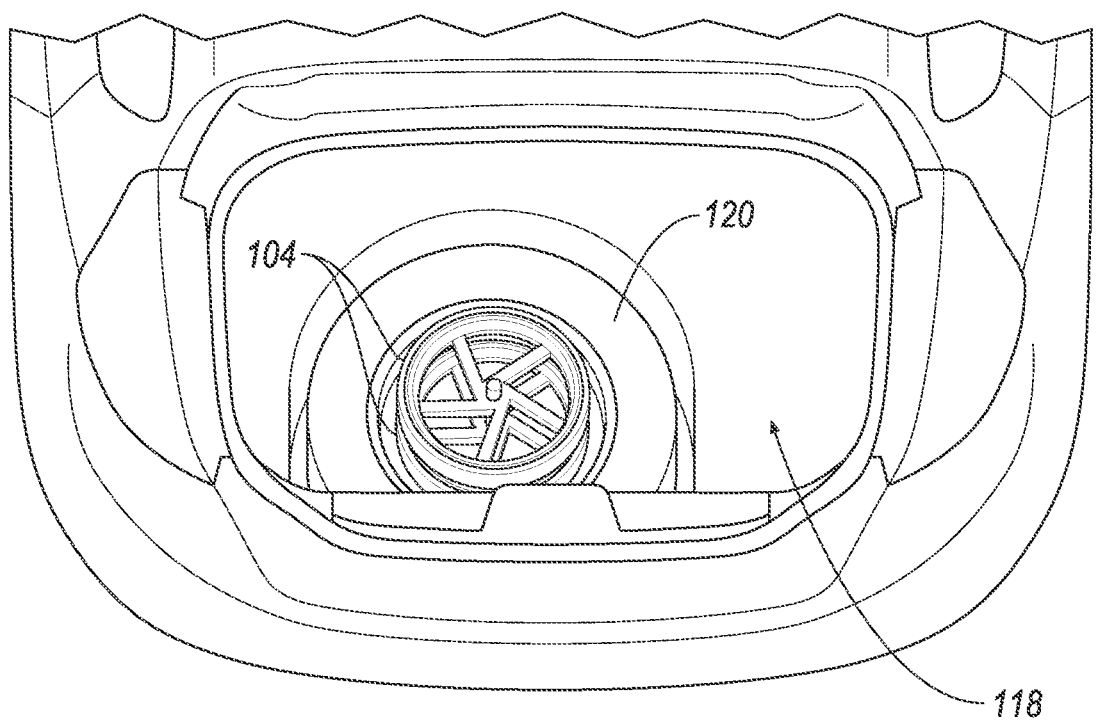
FIG. 7 is a perspective view of wheels of the scooter of FIG. 1 stored in a spare wheel.

As shown in FIG. 7, to save space while storing the scooter 10 in the vehicle trunk 118, the rear wheel 104 and the front bike wheel 104 may be stored in the spare wheel 120. In one example, the wheels 104 may be stack vertically on top of one another.

As explained above, the scooter 10 may be powered by the electric motor 62.

Referring again now to FIGS. 1-5, the scooter 10 may include a human machine interface (HMI) 114 mountable to the steering column 94 upper end 96. The HMI 114 may include known elements, e.g., output elements, e.g., a display and input elements, e.g., touch screen, for receiving user inputs, a screen, e.g., LCD screen. The HMI 114 may further include a processor 116. The processor 116 may be programmed to receive user input, e.g., a desired, i.e., target, speed, and to output data, e.g., a current speed, to a display screen of the HMI 114. The processor 116 may be further programmed to output acceleration/deceleration instructions to the electric motor 62, e.g., a 30% Pulse Width Modulation (PWM) duty cycle, in accordance with, e.g., the user input. To communicate with the electric motor 62, the HMI 114 may include, e.g., a power line communication interface. The processor 116 may be programmed to communicate via the power line interface with the electric motor 62 or any other component of the scooter 10 with a power line interface. The power line is transformed into a data line via the superposition of a low energy information signal to the power signal, e.g., a frequency modulated signal wave.

A battery 20 supplies electrical energy to the electric motor 62 to move the scooter 10 in a scooter or bike mode in a forward or reverse direction. Additionally, the battery 20 may receive and store electrical energy from the electric motor 62, when the electric motor 62 is operated in a generator mode. For example, a part of the torque provided by the user in the bike mode may be used to produce electrical energy in a known manner.

The electric motor 62, typically a direct current (DC) motor, is mounted to the rear body portion 56 and coupled to the gearbox 64. The electric motor 62 may include power line communication circuit to receive acceleration and deceleration signals from the HMI 114 processor 116 or any other electronic device. The scooter 10 may include electronic drive circuit (e.g., disposed inside the electric motor 62 housing) to convert the received signals from the HMI 114 to PWM signals to operate the electric motor 62.

The scooter 10 includes a charging connector 30, e.g., a USB charging interface or other known charging interface, to charge the battery 20, e.g., at a charging station. The charging connector 30 may be mounted to, e.g., a front body portion 14 surface 19.

The scooter 10 may include a wiring harness 22, e.g., copper wires, electrically connected to, e.g., the battery 20, the HMI 114, and the electric motor 62. The data signals may be communicated through the same wires of the wiring harness 22 that transfer electrical energy, e.g., using power line communication. The wiring harness 22 may include separate pieces disposed in the steering column 94, the front and the rear body portions 14, 56. The pieces of the wiring harness 22 can be electrically connected to one another in the Bike and standing modes via connectors included in the scooter 10, as explained further below.

To provide electrical connection to the HMI 114, the scooter 10 may include steering column harness connectors 23 mounted to an interior surface of the first and second steering column holders 54, 52. The first and the second steering harness connectors 54, 52 provide electrical connection in the standing and bike modes respectively. Additionally, the steering column 94 may include a connector 97 to provide electrical connection between the wiring harness 22 and the HMI 114.

The scooter 10 may include a rear portion electrical connector 82 providing electrical connection to either a bike mode harness connector 24, e.g., when the scooter 10 is in the bike mode, or a standing mode harness connector 32, e.g., when the scooter is in the standing mode. To provide electrical connectivity, the rear portion electrical connector 82 may include a conducting surface, e.g., copper surface, mounted to the rear body portion 56 second connecting side 60 electrically insulated from the scooter body 12. The copper surface of the rear portion electrical connector 82 may face away from the rear body portion 56.

The standing mode harness connector 32 and the bike mode harness connector 24 each may include a conducting surface, e.g., copper surface, mounted to the front body portion 14 first connecting side 18 and electrically insulated from the scooter body 12. The connectors 24, 32 may face away from the front body portion 14. When the scooter body 12 is in the compact state, e.g., the standing mode, the rear portion electrical connector 82 may be electrically connected to the standing mode harness connector 32. When the scooter body 12 is in the extended state, e.g., the bike mode, the rear portion electrical connector 82 may be electrically connected to the bike mode harness connector 24.

Figure 8:
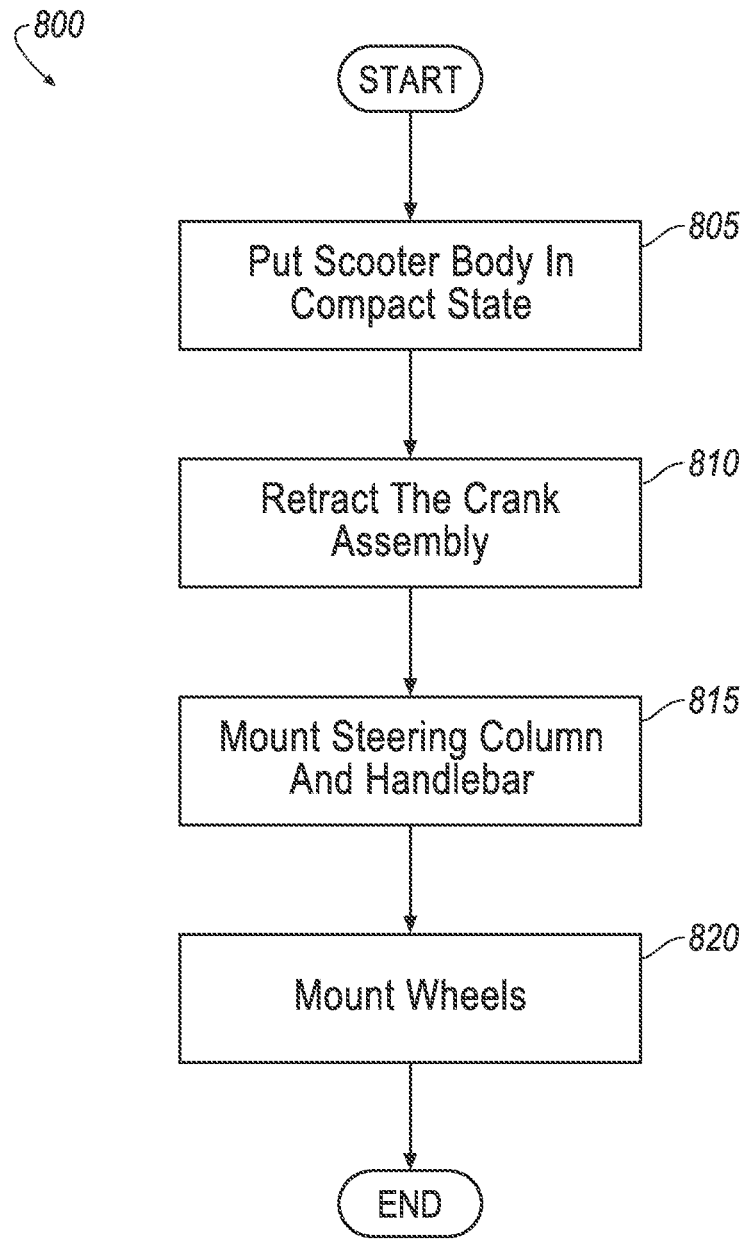
FIG. 8 is a process flow diagram illustrating an example process of putting the scooter in the extended state.

FIG. 8 illustrates an example process 800 to put the scooter 10 in the standing mode, e.g., from the bike mode. The steps of the process 800 may be executed in various orders other than shown. Additionally or alternatively, at least some of the steps may be executed in the same time.

The process 800 begins in a step 805, in which the scooter body 12 is in the compact state. Otherwise, the user may put the scooter body 12 in the compact state.

Next, in a step 810, the user may retract the crank assembly 38. The pedals 50 and/or crank arms 48 should be unmounted from the crank gear 40, if already mounted. The crank assembly frame 44 may be pivoted about the axis A1 and stored within the front body portion 14.

Next, in a step 815, the user may mount the steering column 94 and the handlebar 100. The steering column 94 lower end 98 is mounted to the first steering column holder 54, i.e., steering column 94 is pivotable about the axis A2. Additionally, the steering column harness connector 23 of the first steering column holder 54 may electrically connected to the part of wiring harness 22 included in the steering column 94. The handlebar 100 may be mounted to the steering column 94 upper end 96. Additionally, the HMI 114 may be mounted to the steering column 94 upper end 96. The HMI 114 may be electrically connected to the connector 97 of the steering column 94.

Next, in a step 820, the user may mount the front wheels 102 and the rear wheels 104. The front wheel(s) 102 may be rotatably mounted to the steering column 94 lower end 98, e.g., via the wheel holder assembly 88. The rear wheels 102 may be rotatably mounted to the transmission 70, e.g., worm shaft 78. The rear wheels 104 may rotate about the axis A5.

Following the step 820, the scooter 10 is in the standing mode, and the process 800 ends.

Figure 9:
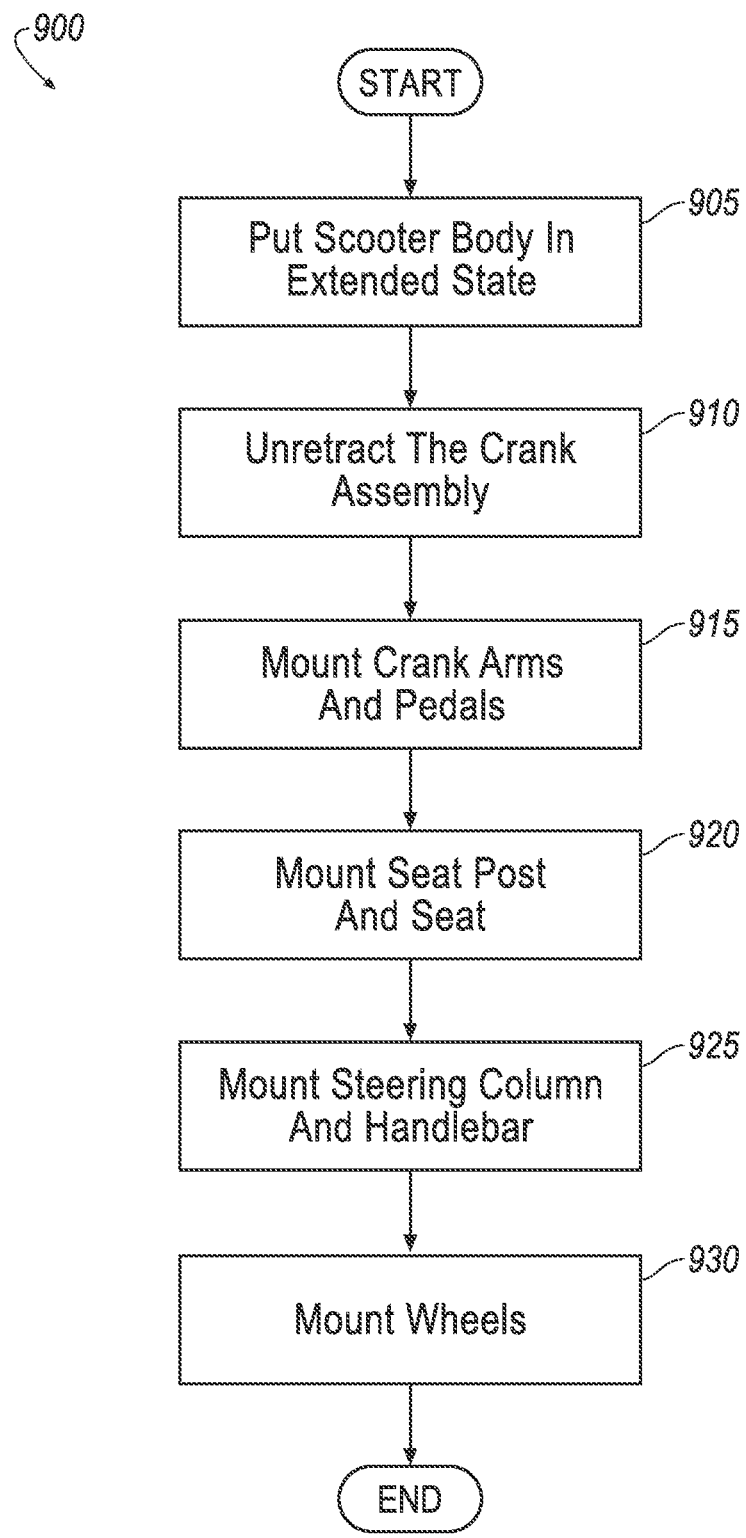
FIG. 9 is a process flow diagram illustrating an example process of putting the scooter in the "bike" mode.

FIG. 9 illustrates an example process 900 to put the scooter 10 in the bike mode, e.g., from the standing mode. The steps of the process 900 may be executed in various other sequences than shown. Additionally or alternatively, at least some of the steps may be executed in the same time.

The process 900 begins in a step 905, in which the scooter body 12 is in the extended state, as discussed above. Otherwise, the user may put the scooter body 12 in the extended state.

Next, in a step 910, the user may unretract the crank assembly 38. The crank assembly frame 44 may be pivoted about the axis A1 and moved to the unretracted state, i.e., the crank gear 40 away from the scoter body 12. In the unretracted state, the crank assembly 38 cross engaging gear 42 and the rear cross engaging gear 76 may be mechanically engaged with one another.

Next, in a step 915, the user may mount the crank arms 48 first ends 49 to the crank gear 40. Further, the user may rotatably mount the pedals 50 to the crank arms 48 second ends 49.

Next, in a step 920, the user may mount the seat 110 to the scooter body 12. For example, the seat 110 may be mounted via the seat post 112 to the rear body portion 56.

Next, in a step 925, the user may mount the steering column 94 and handlebar 100. The steering column 94 lower end 98 is mounted to the second steering column holder 52, i.e., the steering column 94 is pivotable about the axis A3. Additionally, the steering column harness connector 23 of the second steering column holder 52 may electrically connect to the part of wiring harness 22 included in the steering column 94. The handlebar 100 may be mounted to the steering column 94 upper end 96. Additionally, the HMI 114 may be mounted to the steering column 94 upper end 96. The HMI 114 may be electrically connected to the connector 97 of the steering column 94.

Next, in a step 930, the user may mount the front and rear wheels 104. The front wheel 104 may be rotationally mounted to the steering column 94 lower end 98. The rear wheels 104 may be mounted to the transmission 70, e.g., worm gear 72. The rear wheels 104 may rotate about the axis A4.

Following the step 930, the scooter 10 can be in the bike mode and the process 900 ends.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A scooter, comprising a scooter body, the scooter body comprising:
   a triangular front body portion including a front side and a first connecting side, wherein the front side and first connecting side form a first acute angle;
   a triangular rear body portion including a rear side and a second connecting side, wherein the rear side and second connecting side form a second acute angle;
   wherein the first and second connecting sides are connected so as to linearly slide with respect to one another such that when the scooter body is in an extended state the front side has a greater distance from the rear side than when the scooter body is in a compact state; and
   a steering column, wherein the front body portion further includes a first steering column holder and a second steering column holder transverse to the first steering column holder, and wherein the steering column is releaseably mountable to the first steering column holder when the scooter body is in the compact state, and releaseably mountable to the second steering column holder when the scooter body is in the extended state.

2. The scooter of claim 1, further comprising a plurality of rear wheels mountable to the rear body and a crank assembly mounted to the front body, wherein the crank assembly is driveably engageable to the rear wheels.

3. The scooter of claim 2, wherein the crank assembly is engageable with the rear wheels when the scooter body is in the extended state.

4. The scooter of claim 2, wherein the rear wheels are rotatable about an axis transverse to a side surface of the scooter body extending from the front side to the rear side, when the scooter body is in the extended state.

5. The scooter of claim 2, wherein the crank assembly further includes a crank gear and a cross engaging gear driveably coupled to the crank gear, the cross engaging gear driveably engageable with the rear wheels when the scooter body is in the extended state.

6. The scooter of claim 5, wherein the crank assembly further includes a crank assembly frame retractably mounted to the front body, and wherein the crank gear and the cross engaging gear are rotatably mounted to the crank assembly frame.

7. The scooter of claim 6, further comprising a crank arm releaseably attachable to the crank assembly and drivably engageable with the rear wheels when the crank assembly is in an unretracted state.

8. The scooter of claim 1, further comprising a plurality of rear wheels mountable to the rear body and a transmission driveably engageable with the rear wheels.

9. The scooter of claim 8, wherein the rear wheels rotate about an axis transverse to a side surface of the scooter body extending from the front side to the rear side when the scooter is in the extended state.

10. The scooter of claim 8, wherein the rear wheels rotate about an axis parallel to a side surface of the scooter body extending from the front side to the rear side when the scooter body is in the compact state.

11. The scooter of claim 8, wherein the front body further includes a crank assembly, and the transmission further includes a worm gear rotatably engageable with the rear
    wheel when the scooter body is in the compact state, a cross engaging rear gear coupled to the worm gear and engageable to the crank assembly.

12. The scooter of claim 11, wherein the crank assembly of the front body includes a cross engaging gear, and the rear cross engaging gear is engageable with the cross engaging gear when the scooter is in the extended state.

13. The scooter of claim 8, wherein the transmission further includes a worm shaft supported by the rear body and engageable with the rear wheels when the scooter is in the compact state, the worm shaft including one or more worms rotatably engageable with one or more worm gears supported by the rear body, and an electric motor driveably coupled to the worm gears.

14. The scooter of claim 1, wherein the rear body further includes a seat pole holder parallel to the front and the rear sides, wherein a seat pole is releaseably mountable to the seat pole holder.

15. The scooter of claim 1, further comprising a standing mode harness connector and a bike mode harness connector mounted to the first connecting side of the front body portion, and a rear portion electrical connector mounted to the second connecting side of the rear body portion.

16. The scooter of claim 15, wherein at each of the compact states of the scooter body at least one of the standing mode harness connector and the bike mode harness connector is electrically connectable to the rear portion electrical connector.

17. A scooter, comprising a scooter body, the scooter body comprising:
    a triangular front body portion including a front side and a first connecting side, wherein the front side and first connecting side form a first acute angle; and a triangular rear body portion including a rear side and a second connecting side, wherein the rear side and second connecting side form a second acute angle;

a plurality of rear wheels mountable to the rear body and a transmission driveably engageable with the rear wheels;

wherein the front body further includes a crank assembly, and the transmission further includes a worm gear rotatably engageable with the rear wheel when the scooter body is in the compact state, a cross engaging rear gear coupled to the worm gear and engageable to the crank assembly;

wherein the first and second connecting sides are connected so as to linearly slide with respect to one another such that when the scooter body is in an extended state the front side has a greater distance from the rear side than when the scooter body is in a compact state, and wherein the crank assembly of the front body includes a cross engaging gear, and the rear cross engaging gear is engageable with the cross engaging gear when the scooter is in the extended state.

* * * * *